Nov. 24, 1964 P. O. H. LANGE 3,158,053
MULTI-SPINDLE LATHE
Filed May 3, 1960 4 Sheets-Sheet 1

INVENTOR
PAUL O. H. LANGE
BY
ATTORNEYS

Nov. 24, 1964  P. O. H. LANGE  3,158,053
MULTI-SPINDLE LATHE
Filed May 3, 1960  4 Sheets-Sheet 2

INVENTOR:
Paul O.H. LANGE
BY
AGT.

Nov. 24, 1964 P. O. H. LANGE 3,158,053
MULTI-SPINDLE LATHE
Filed May 3, 1960 4 Sheets-Sheet 4

INVENTOR:
Paul O. H. LANGE

United States Patent Office 3,158,053
Patented Nov. 24, 1964

3,158,053
MULTI-SPINDLE LATHE
Paul O. H. Lange, Bielefeld, Germany, assignor to Werkzeugmaschinenfabrik Gildemeister & Comp., Aktiengesellschaft, Bielefeld, Germany
Filed May 3, 1960, Ser. No. 26,534
7 Claims. (Cl. 82—3)

This invention relates in general to lathes and in particular to a new and useful multi-spindle lathe having cam-controlled tool feeding mechanisms, some of which include individual power-driven operating or feed mechanisms.

The present invention particularly contemplates multi-spindle automatic lathes equipped with a horizontally disposed spindle carrier having a plurality of rotatable spindles and separate tool feed mechanisms operated under the control of cams on a control shaft extending substantially parallel thereto at a spaced location therefrom. More specifically this invention is also directed to a multi-spindle lathe having two groups of tool feeding mechanisms actuated in a different manner.

The present application is a continuation-in-part application of copending application Serial No. 803,986, filed April 3, 1959, now abandoned.

Multi-spindle automatic lathes are well known. It is a drawback of these machines that they are useful either only for light or only for heavy workloads and are designed either solely for highly precise finishing work or solely for crude pre-finishing work. As a result these machines do not operate economically.

There are also machines known, in which the control shaft thereof is subdivided and is located as closely as possible to the tool slide. The adjustable elements in such constructions were complicated, as they have to comply with practical requirements of rigidity and adaptability to the workpiece formation.

Accordingly, an object of this invention is to provide a multi-spindle lathe having one or more independently controlled motor-driven tool feeding units.

A further object of the invention is to provide a multi-spindle lathe including a plurality of tool feeding mechanisms, at least one of which is driven and controlled by a separate motor drive.

It is another object of the invention to provide means improving the work economy of multi-spindle automatic lathes, as well as facilitating the adaptability of such lathes to various workpiece formations and operations.

Another object of the invention is to provide means conducive to a highly efficacious construction of a multi-spindle automatic lathe with driving means, gearing means, and with control means which allow machining bulky workpieces or blanks, as well as very precise and complicated workpieces or blanks.

A still further object of the invention is to provide means affording the operation of automatic lathes in such a way that the workpiece may be machined and finished in its initially clamped or held position and without shifting same. Thus crude pre-finishing work and precise finishing work may be performed on the same workpiece without removing it from its initially clamped position.

Another object of the invention is to provide means devising a multi-spindle lathe with easily adjustable cam and gearing control means arranged to keep set-up time consumption at a minimum.

The present invention contemplates further a multi-spindle automatic machine tool, which maintains the heretofore cam-controlled drives only for some of its tool supports or slides, but provides for the other tool supports or slides special automatic individual motor-driven tool-feed or tool-advancing units, when the latter tool slides or supports are to be subjected to heavy cutting or machining load or where during working operation high finishing accuracy is required or when often and difficult adjustment and constant tool alignments become necessary.

For instance, three or four supports or slides of a multi-spindle automatic machine tool are operated in the usual way from a cam control shaft operating through mechanical linkages, while the control of the remaining three or more tool slides which have to fulfill the above mentioned or other requirements, is achieved, according to the invention, by separately driven independent feed or tool advance units operated through precise tool advancing mechanisms.

In this manner a combination of tool slide units is obtained which distinguishes itself not only by great rigidity, but offers also flexible adaptability to the respective work conditions and operations.

It is therefore a very important and primary object of the invention to provide means affording a rigid, uncomplicated and sturdy machine tool construction of the aforesaid type, which is substantially free from vibrations, and offering an advantageous arrangement of and ready accessibility to special tool slides of said machine destined especially for heavy duty work and conditions.

The combination of central driving-, gearing- and control means with independent driving-, gearing- and control means, according to the invention, has the advantage that the lathe may be easily tooled for and adapted to many different requirements.

These and other advantages and objects of the invention will appear more clearly from the following description in connection with the accompanying drawings, in which.

Figure 2:
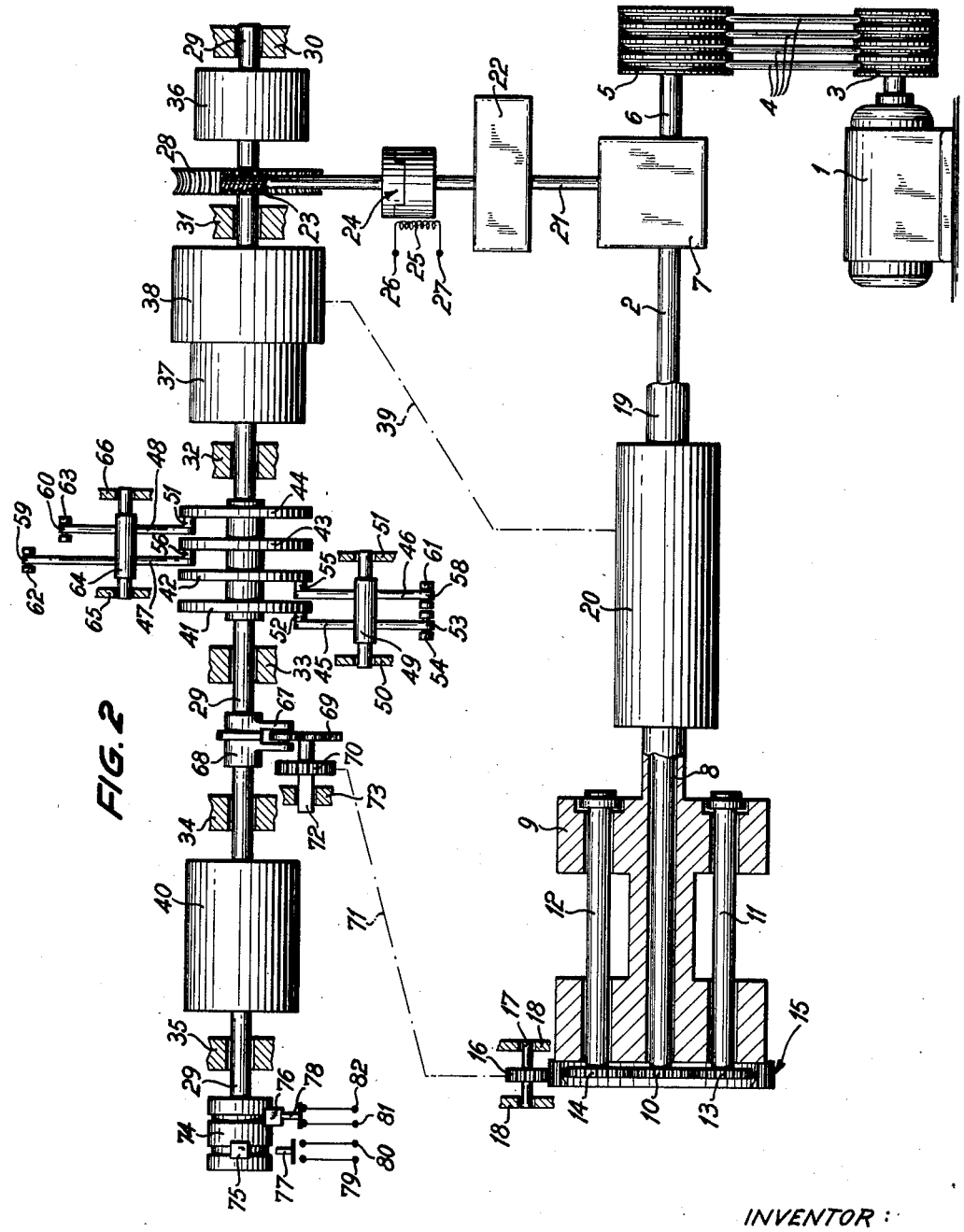
FIG. 2 is a fragmentary and schematic side elevation of the multi-spindle lathe of FIG. 1, parts being shown in section.

Referring to the drawings in particular, the invention embodied therein includes, as best seen in FIG. 2, a main driving motor 1 having a multi-grooved V-belt pulley 3 affixed to its shaft and arranged to drive a similar pulley 5 on a shaft 6 through belts 4. The shaft 6 connects to a speed change gear box schematically illustrated at 7. The selected internal gearing is arranged to drive output drive shaft 2.

A spindle drum 9 is provided with a hollow bore 8 to accommodate the shaft 2 which extends therethrough and terminates in a gear 10 which is affixed to its outer end for rotation therewith.

Gear 10 meshes with a plurality of gears radially spaced about the circumference thereof and two of which gears 13 and 14 are illustrated. Each gear is connected to an associated workpiece holding spindle, such as the spindle 11 and its gear 13 and the spindle 12 and its gear 14, which are illustrated.

Figure 1:
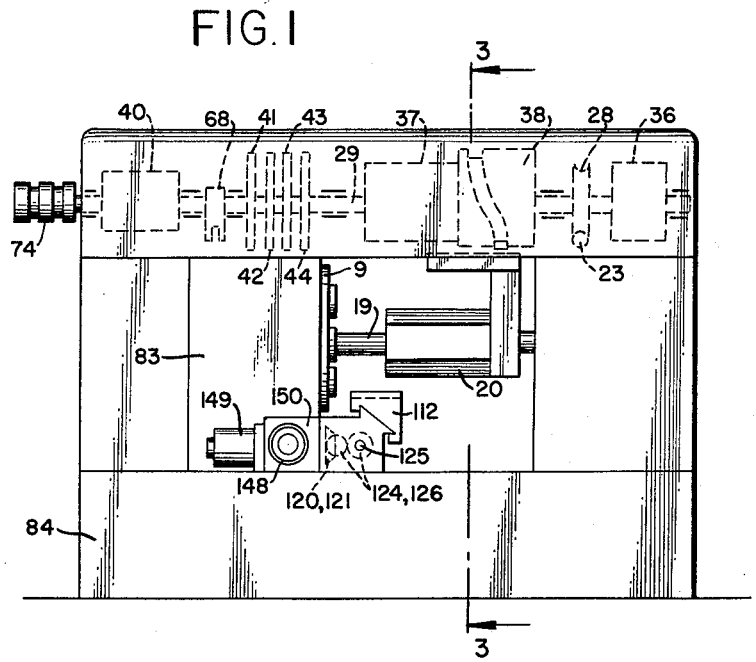
FIG. 1 illustrates an elevational view of a multi-spindle lathe constructed in accordance with the invention with portions of the internal mechanism indicated in dotted lines.

The spindles 11 and 12 and all other spindles (not shown in FIG. 1) are supported and journalled in said spindle drum 9 in a known manner.

The spindle drum 9 is provided with an external spur gear 15 which is in engagement with an intermediate spur gear 16. The spur gear 16 is supported with its shaft 17 in a bearing box of which bearing members 18 are only schematically indicated. Means, to be described more fully hereafter, are provided for driving gear 16 in timed relation to rotate gear 15 and spindle drum 9.

Further, spindle drum 9 is provided with an elongated central bushing extension 19 which carries a longitudinally shiftable polygonal tool slide 20 to be moved by cam drum 38.

The speed gear box 7 is connected by means of driven shaft 21 to a feed gearing 22. Feed gearing 22 is connectable to a worm 23 to rotate the latter under the control of an electromagnetic clutch 24 provided with a magnetic field coil 25 with terminals 26 and 27. The function of clutch 24 as a safety device will be described later. Worm 23 is one member of a worm gear, the wheel 28 of which is mounted on a central cam control shaft 29.

The central cam control shaft 29 is supported in a bearing box of which, for convenience of drawing, bearing members 30, 31, 32, 33, 34 and 35 are shown only. According to the invention the central cam control shaft 29 is mounted in such a manner that it extends parallel to the spindle drum 9 and parallel to the main driving shaft 2.

Adjacent the worm wheel 28 which drives the control shaft 29, there is mounted a cam drum 36 commonly known in the art. Cam drum 36 is conveniently accessible for differently tooling the lathe.

Another cam drum 37 is mounted, together with a further cam drum 38, on shaft 29 between bearing members 31 and 32. Cam drum 37 is also provided for differently tooling the lathe, whereas cam drum 38 is provided for longitudinally advancing the longitudinal tool slide 20. This is known in the art and the engagement between a cam of cam drum 38 and tool slide 20 is merely indicated by line 39. Thus the slide 20 is shifted under the control of cam drum 38.

Cam drum 40 mounted on shaft 29 between bearing members 34 and 35 is provided for controlling the thrust- and gripping means (not shown) in the case of automatic bar machines, and in automatic chuck machines cam drum 40 controls the means for stopping the spindle.

According to the invention the central portion of the cam control shaft 29 is provided with driving cams 41, 42, 43, 44 which are mounted between its bearing means 33 and 34. Cams 41 through 44 drive, by means of levers 45, 46 on one side and 47, 48 on the opposite side, central tool slides shown in FIG. 3. Levers 45 and 46 are pivotally mounted with their common shaft 49 in bearing means 50 and 51.

One end 52 of lever 45 is in engagement with cam 41, while the other end 53 of lever 45 is pivotally connected to a link 54. In the same manner ends 55, 56 and 57 of levers 46, 47 and 48 are in engagement with cams 42, 43 and 44, respectively. The other ends 58, 59 and 60 of levers 42, 43 and 44 are also pivotally connected to links 61, 62 and 63.

Levers 47 and 48 are pivotally mounted with their common shaft 64 in bearing means 65 and 66. Control shaft 29 effects the thrust movement of central side tool supports or slides shown in FIG. 2.

A control lever 67 (referring back to FIG. 2) is mounted with its bushing 68 on the central cam shaft 29. This control lever 67 drives a Geneva gear type indexing mechanism 69 which in turn drives through spur gear 70 and line 71 spur gear 16 to rotate the spur gear 15 of the spindle drum 9.

Line 71 indicates that spur gear 70 is in engagement with spur gear 16. The indexing mechanism 69 and the spur gear 70 are mounted on a common shaft 72 which is pivotally supported in bearing means 73. Thus spindle drum 9 is indexed from one position to the next in accordance with rotation of the cam shaft 29.

The cam shaft 29 carries on one end a bushing 74 provided with two switching cams 75 and 76. These switching cams 75 and 76 actuate electrical switches 77 and 78 depending on the turns of the cam shaft 29. Electrical switch 77 with its terminals 79 and 80 is shown in its open position, while switch 78, being engaged with cam 76, is shown in its closed position connecting its terminals 81 and 82.

Figure 3:
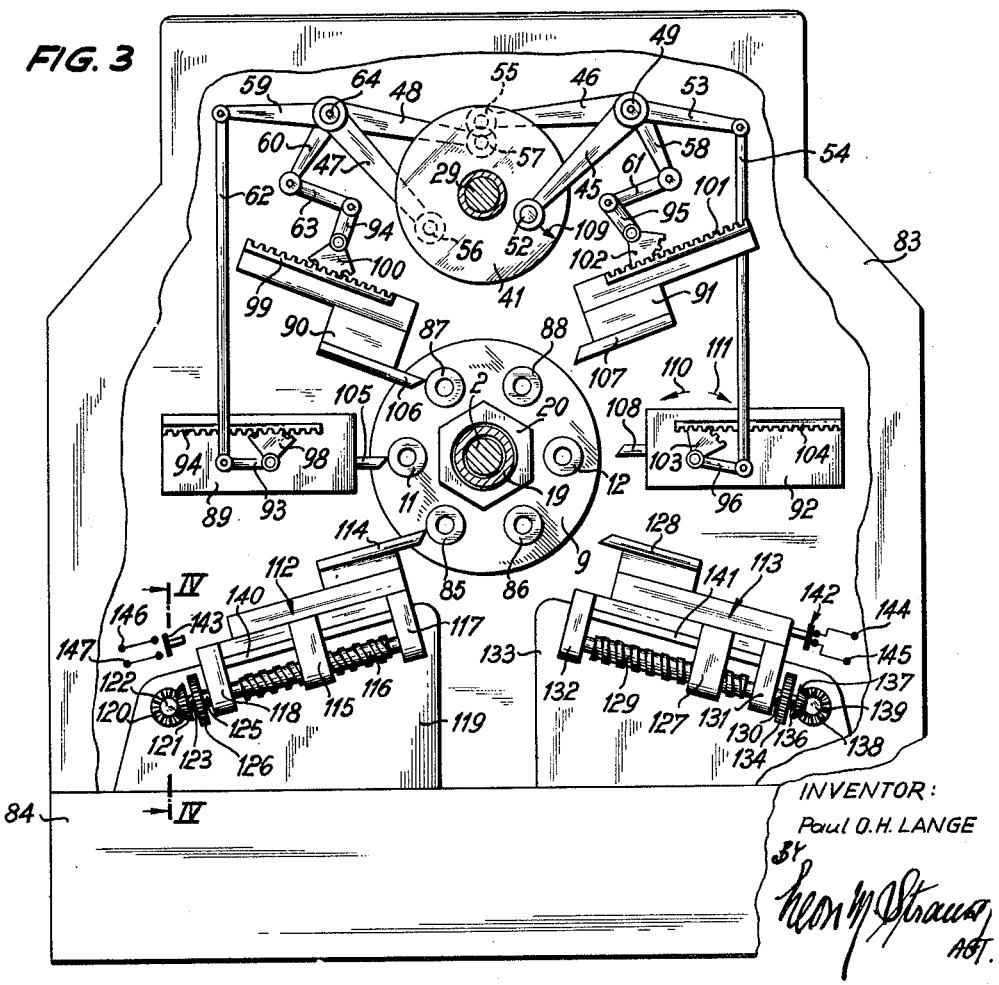
FIG. 3 is a vertical section taken on the line 3—3 of FIG. 1 of a multi-spindle lathe with its front plate partly broken away.

Switches 77 and 78 are provided for switching on the driving means of independent side tool slides 112 and 113 shown in FIG. 3.

From FIG. 2 it may readily be seen that the cam control shaft 29 extends parallel to the spindle drum 9 and also to the central driving shaft 2.

In FIG. 3 there is illustrated the tool feeding or tool advancing mechanisms of the multi-spindle automatic lathe according to the invention. The front plate 83 is shown with its center portion broken away. All parts are mounted on a chassis 84.

As seen in FIG. 3, the horizontally extending spindle drum 9 is mounted on the central driving shaft 2 below the central cam control shaft 29. The spindle drum 9 includes rotatable spindles 11, 12, 85, 86, 87 and 88 which are supported in the spindle drum 9. The central driving shaft 2 also carries the longitudinal tool slide 20. In FIG. 3, of the cams mounted on cam control shaft 29, only cam 41 is shown.

According to the invention the lathe comprises two groups of tool supports and feeding mechanisms. The first group comprises supports 89, 90, 91 and 92, and the second group supports 112 and 113. The supports 89, 90, 91 and 92 are both driven and controlled by the cam control shaft 29 by means of cams 41, 42, 43 and 44 (of which only cam 41 is shown in FIG. 3) which actuate levers 45, 46, 47, 48 and further levers 54, 61, 62 and 63.

The levers 54, 61, 62 and 63 actuate, through connecting levers 93, 94, 95 and 96, sector gears 98, 100, 102 and 103 which in turn drive the tool supports 89, 90, 91 and 92. Support 89 is provided with a rack 97 which is in engagement with gear 98. Rack 99 of support 90 is in engagement with gear 100, while the rack 101 of support 91 is driven by pinion 102. Gear 103 drives rack 104 of support 92.

Cams 41, 42, 43, 44 are shaped in such a manner that several tool supports are in their working position, while others are in their starting position, e.g. tool supports 89 and 90 with their tools 105 and 106 are shown in working position while tool supports 91 and 92 with their tools 107 and 108 are shown in their starting position.

The back and forth movement of support 92 will be described by way of example. If lever 45, the end 52 of which is in engagement with cam 41, moves in the direction of arrow 109 (FIG. 3—to the right), lever 53 will move upwardly, thereby lifting link 54 which is pivotally connected to lever 96. This upward motion of link 54 turns sector gear 103 in the direction of arrow 110 (counterclockwise) in such a manner that support 92 is moved to the left into its working position.

Downward movement of link 54 turns sector gear 103 in the direction of arrow 111 (clockwise), thereby driving support 92 back to the right in the starting position, as shown. The operation of the mechanism for driving supports 89, 90 and 91 is the same as the operation described above.

Figure 4:
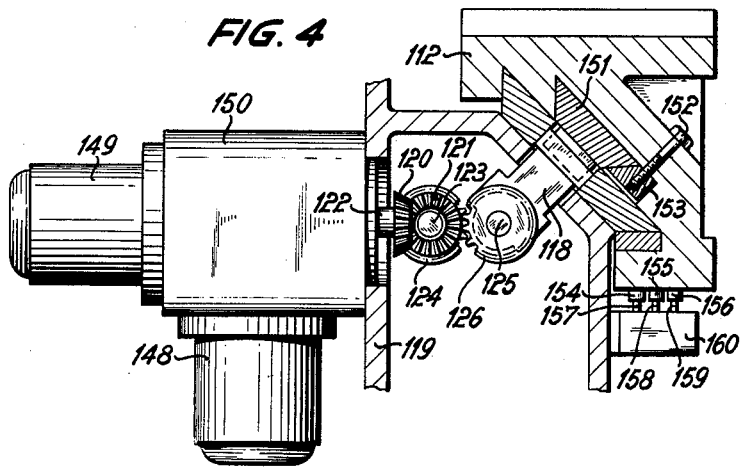
FIG. 4 is an enlarged fragmentary section taken along the line 4—4 of FIG. 3 of an independent driving- and gearing means for a specific tool support and feeding mechanism destined for special work requirements.
Figure 5:
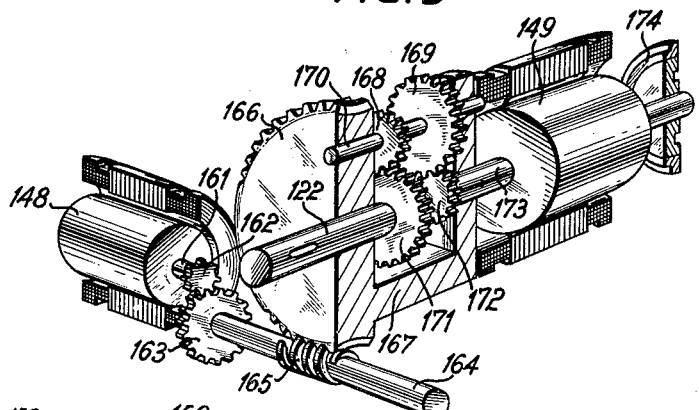
FIG. 5 is a perspective view of motor driving connections of the independent driving- and gearing means.

The second group of tool supports comprises the supports 112 and 113 which are driven and controlled, according to the invention, by independent driving-, gearing- and control means as shown in FIGS. 3, 4 and 5. Tool supports 112 and 113 are destined for specific, particularly heavy workload.

Tool support 112 which carries a tool 114 is mounted on a spindle nut 115 driven by a spindle 116. Spindle 116 is supported in bearing means 117 and 118 which, in turn, are mounted on a frame 119 supported by chassis 84.

Referring to FIG. 4 spindle 116 is driven to advance or retract the tool 114 by means of one of two motors 148 and 149 driving through a bevel gear 120 mounted on shaft 122 extending through frame 119 and driven by the motor means shown in FIGS. 3, 4 and 5. A bevel gear 121 is in engagement with bevel gear 120 and is mounted on shaft 123 which also carries a spur gear 124.

Shaft 123 is mounted in bearing means 118 while shaft 125 of spindle 116 extends through bearing means 118. Shaft 125 carries spur gear 126 which is engaged with the spur gear 124 (shown in FIG. 4) and drives spindle 116 by means of said engaged spur gears 124 and 126.

The right hand tool support 113, also driven by independent driving means in a similar manner, is symmetrical to the left hand tool support described above. Tool support 113 is mounted on its spindle nut 127 and carries a tool 128. The spindle nut 127 is driven by a spindle 129 with its shaft 130 supported in bearing means 131 and 132 which are mounted on a frame 133 supported on chassis 84.

Shaft 130 carries a spur gear 134 in engagement with a further spur gear 135 (not shown). Spur gear 135 is mounted on shaft 136 which carries a bevel gear 137 engaged with bevel gear 138 mounted on shaft 139 extending through frame 133 and driven by the independent driving means shown in FIGS. 4 and 5.

Each support 112 and 113 comprises a guide rod 140 and 141 for guiding the spindle nuts 115 and 127, respectively. Guide rod 140 is mounted between bearing means 117 and 118 while guide rod 141 is mounted between bearing means 131 and 132.

The operation of the supports 112 and 113 is controlled by electrical switching means 142 and 143, respectively (FIG. 3). Switch 142 comprises terminals 144 and 145 and switch 143 comprises terminals 146 and 147. These switches are provided for controlling the safety electromagnetic clutch 24 shown in FIG. 2.

The safety device works as follows: Switch terminals 144 and 145 are connected in series with switch terminals 146 and 147. The two switches 142 and 143 thus connected in series are connected in series with terminals 26 and 27 of the magnetic field coil 25 of clutch 24 and are further connected in series with a supply voltage for said coil 25.

As indicated in FIG. 3, the tool slides 90, 89 and 112 are shown in the operative position and the tool slides 91, 92 and 113 in the starting position. The two tool slides 112 and 113 close the switching elements 143 and 142, respectively, in the starting position. If either of these switching elements is not actuated, due to the fact that the tool slide has not moved back to its starting position, the electromagnetic coupling 24 will not be in position for actuation and the control shaft 29 will be inoperative. Then a further switching of the spindle drum 9 into the next working position cannot take place.

FIG. 4 illustrates an independent driving- and gearing unit for said specific tool supports destined for special workload. The unit comprises a feed motor 148, a high speed motor 149 and a gearing box 150 mounted on the backside of the frame 119 shown in FIG. 3.

Tool support 112 is driven through bevel gears 120, 121 and by spur gears 124, 126. Bevel gear 120 is mounted on driving shaft 122 and it is in engagement with bevel gear 121 mounted on shaft 123.

Spur gear 124, also on shaft 123, engages spur gear 126 mounted on shaft 125 which drives by means of spindle 116 (shown in FIG. 4) the spindle nut 115 and thereby tool support 112 which glides along guide 151. Screw 152 with clamping device 153 allows adjustment of the tool support with respect to the spindle nut 150.

Tool support 112 is provided with cams 154, 155 and 156 for actuating switching means 157, 158 and 159, depending on the movement and relative position of tool support 112. The function of these switches will be described in reference to FIG. 7.

Switches 157, 158 and 159 are mounted on a holder 160 along the gliding path of tool support 112. Bevel wheels 120 and 121 are provided with spiral gearing teeth. Any other tool support destined for specific workload is driven by a unit comprising the same parts and structure in the same manner as described above for tool support 112.

The perspective view of FIG. 5 illustrates a sectional view through feed motor 148, gear box 150, and through high speed motor 149.

The feed motor 148 drives with its shaft 161 a reduction gear with spur gears 162 and 163 which may be arranged exchangeably. Spur gear 163 is mounted on shaft 164 provided with self-locking worm 165 which is in engagement with its worm wheel 166 mounted on shaft 122. To worm wheel 166 there is attached a gear box 167 which houses a planet gear with gears 168 and 169 mounted on shaft 170.

Gear box 167 further comprises spur gear 171 mounted on shaft 122 and in engagement with planet gear 168, and spur gear 172 mounted on shaft 173 of high speed motor 149, and in engagement with planet gear 169.

Worm wheel 166 and planet gears 168, 169 are locked in their position by the self-locking worm 165 if feed motor 148 does not run. When the feed motor does not run the high speed motor 149 drives shaft 122 by means of gear 172, planet gears 168, 169 which work as reduction gear, and gear 171.

On the other hand, if high speed motor 149 does not run, feed motor 148 drives worm wheel 166 which carries along the planet gears 168, 169. The shaft 173 of high speed motor 149 is provided with an electromagnetic brake 174 in order to lock gear 172 on shaft 173 for driving shaft 122 through feed motor 148. With the spur gear 172 locked, the planet gear 169 hobs along wheel 172 and the slow revolution of worm wheel 166 is transferred in a certain gear ratio to shaft 122.

For certain works, such as facing, free-cutting and the like it is necessary to provide a fixed stop position. This stop has to bear the entire thrust force.

Figure 7:
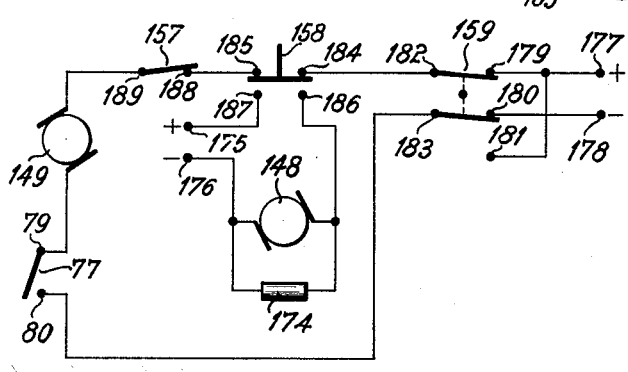
FIG. 7 shows an electric wiring diagram of a circuit for controlling the independent driving- and gearing means independent from the movement of tool supports.

The wiring diagram of FIG. 7 shows the feed motor 148, the high speed motor 149, the electromagnetic brake 174, and switching means 78, 157, 158, 159. Terminals 175, 176 and 177, 178 are connected to a power supply source. The circuit is shown with the tool support 133 (shown in FIG. 3) in its starting position and with switch 77 open, as shown in FIG. 2.

The circuit works as follows: The turning control shaft 29 (FIG. 2) closes with its cam 75 switch 77 and thereby makes the following circuit for high speed motor 149:

Terminal 177, terminal 179 connected to line terminal 182 by switch 159, terminal 184 connected to line terminal 185 by switch 158, terminal 188 connected to line terminal 189 by switch 157, high speed motor 149, terminal 79 connected to terminal 80 by means of switch 77, terminal 183 connected to terminal 180 via switch 159, and back to terminal 178 of the power supply.

Switches 157, 158 and 159 are actuated by cams 154, 155 and 156, as shown in FIG. 4, in the following manner, depending on the movement of the tool support:

The high speed motor 149 connected in the above described circuit runs until respective cam switch 158 is actuated, which cam switch then opens the circuit for the high speed motor by disconnecting terminals 184, 185, and thereby closes the circuit for feed motor 148 and electromagnetic brake 174 by bridging terminals 186, 187. This circuit remains closed until the support releases switch 158 and actuates switch 159 when the work part of the entire circle is finished.

By switching over switch 159 in such a manner that terminal 182 is connected to terminal 180 and terminal 183 to terminal 181, the polarity of supply voltage for high speed motor 149 is reversed. Accordingly the motor runs in the opposite direction and returns the tool support in its starting position. Reaching this position it opens switch 157 as a safety measure and closes it again if switch 77 is open. Switch 159 returns in its shown position when the support reaches its starting position and if switch 77 is open.

The above described cycle is repeated with each closing and opening of switch 77 actuated by shaft 29.

The same circuit is provided for all other independent driving- and control means.

Figure 6:
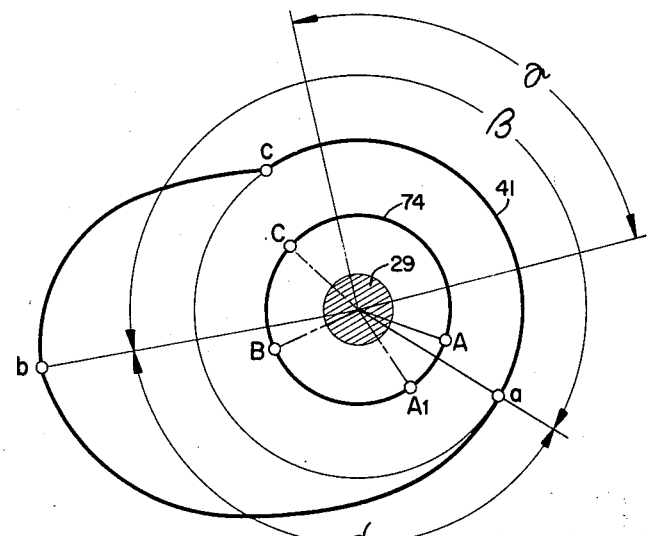
FIG. 6 shows a control diagram effected during one revolution of the control shaft employed in the invention.

The diagram indicated in FIG. 6 shows the cooperation of the cam controlled tool slides with the tool slides which are driven by feeding units during one rotation of the control shaft 29. The cam drums 38, 41 and 44 are arranged on the control shaft 29. The curve on these drums has to be calculated and arranged in such a manner that the feed path of the tool slides 89, 90, 91, 92 and 20 are performed within the region of the angle alpha ($\alpha$).

Within the region of the angle beta ($\beta$) all the tool slides are in the starting position so that within the angle gamma ($\gamma$) the switching of the spindle drum 9 into the next working position can take place.

The movements of the side slides 112 and 113 which are driven by feeding units must also take place within the angle $\alpha$. These movements are independent from the cam control but are, however, controlled from the shaft 29 via the cam drum 74 with the cams 75 and 76 and the switching elements 77 and 78.

In FIG. 6, as an example, there has been shown the cooperation between the cam on the cam drum 41 and the cam drum 74. At $a$ the feed path of the side slide 92 starts and when it has reached point $b$ it has reached the maximum feed path. The return is completed at point $c$. The switching in pulse or command is given on the cam drum 74 by the cam 75 at A via switching element 77 for the rapid speed motor 149. At point A-1, the switching element 158 is actuated by the slide 112 via the cam 155 whereby the transfer from rapid speed to feed speed takes place. At point B the desired working path is terminated and by means of cam 156 the feed motor 148 is stopped via the switching element 159. At the same time the return of the slide 112 starts which ends at C whereby the switching element 143 is closed. The points A-1, B and C have only been plotted with regard to the circular path of the control shaft 29. As described hereinabove, these points are the switching in commands of the switching elements which are actuated by the slides 112 and 113, respectively.

If both the individually controlled slides 112 and 113 return to their starting position, switches 143 and 142 are operated and the machine continues to run. However, if either one or both of the slides 112 and 113 does not return to its starting position, the circuit is interrupted and the spindle drum 9 cannot be re-indexed. Thus, the workpieces mounted on the spindles cannot be brought into operative relation with different tools for a further machining operation.

As a safety provision, a "control period" is provided occupying part of the angle between C and $c$ of FIG. 6, in accordance with the particular function of the machine. Thus, if the slides 112 and 113 are not returned to their starting positions at the point C of FIG. 6, the indexing of the drum 9 cannot be initiated beginning at point $c$. It is only during this "control period" that switches 142 and 143 are controlled by slides 112 and 113. During the remainder of the operating period, clutch 24 is maintained engaged by a follower cam or the like.

It is, of course, to be understood that the present invention is, by no means, limited to the particular arrangements shown in the drawings, but also comprises any modification within the scope of the appended claims.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In a multi-spindle lathe including a plurality of workpiece mounting spindles, means for indexing said spindles to successive work stations, means for rotating each of said spindles, and rotatable tool feed control cam means connected to said spindle rotating means for rotation in timed relationship with said spindles; the improvement comprising first and second tool carriers, there being one tool carrier at each work station and operatively associated with respective spindle at each work station, each tool carrier being mounted for reciprocation toward and away from its associated spindle, first cams included in said feed control cam means and each associated with a respective first tool carrier, first feeding means each mechanically connecting a first cam to its associated first tool carrier to reciprocate the latter in accordance with the position of said feed control cam means, electric motor operated second feeding means each operable to reciprocate a respective second tool carrier toward and away from its associated spindle, each electric motor operated feeding means including planetary gearing means having two input elements and an output element, the output element being connected to the associated second tool carrier, a high-speed tool positioning motor connected to one of the input elements, and a relatively slow-speed tool feed motor connected to the other of the input elements, second cams included in said feed control cam means and each associated with a respective second tool carrier, each second cam, in accordance with the position of said feed control cam means, energizing the high-speed tool positioning motor of its associated second tool carrier feeding means, and cooperating cam and switch means operable by movement of each second tool carrier towards its associated spindle, said cooperating cam and switch means de-energizing the associated tool positioning motor after a predetermined travel of the associated second tool carrier and energizing the associated tool feed motor, and de-energizing the associated tool feed motor and reversely energizing the associated tool positioning motor responsive to a further predetermined movement of the associated second tool carrier.

2. In a multi-spindle lathe according to claim 1, said second tool carrier feeding means each including a threaded screw connected to said planetary gearing output element for rotation thereby, and an internally threaded nut member threadably engaged with said screw and connected to the associated second tool carrier, said nut and the associated second tool carrier being axially moveable in respect to said screw upon rotation of said screw.

3. In a multi-spindle lathe according to claim 1, wherein each first tool carrier feeding means includes follower and lever mechanism in operative engagement with the associated first cam and its associated tool carrier and responsive, upon rotation of the associated first cam, to move the associated tool carrier.

4. A multi-spindle lathe comprising a rotatable drive shaft, a hollow spindle turret extending over said drive shaft and having a plurality of radially spaced work-supporting spindles rotatably mounted thereon, gear means connecting said drive shaft and each of said spindles to rotate said spindles in response to the rotational movement of said drive shaft, means for rotating said drive shaft, means for indexing said spindles to successive work stations, a rotatable cam shaft having feed control cam means thereon, means connecting said cam shaft with said drive shaft for rotation of said cam shaft in timed relation thereto, first and second tool carriers, there being one tool carrier at each work station and operatively associated with a respective spindle at each work station, each tool carrier being mounted for reciprocation toward and away from its associated spindle, first cams included in said feed control cam means and each associated with a respective first tool carrier, first feeding means each mechanically connecting a first cam to its associated first tool carrier to reciprocate the latter in accordance with the position of said feed control cam means, electric motor operated second feeding means each operable to reciprocate a respective second tool carrier toward and away from its associated spindle, each electric motor operated feeding means including planetary gearing means having two input elements and an output element, the output element being connected to the associated second tool carrier, a high-speed tool positioning motor connected to one of the input elements, and a relatively slow-speed tool feed motor connected to the other of the input elements, second cams included in said feed control cam means and each associated with a respective second tool carrier, each second cam, in accordance with the position of said feed control cam means, energizing the high-speed tool positioning motor of its associated second tool carrier feeding means, and cooperating cam and switch means operable by movement of each second tool carrier toward its associated spindle, said cooperating cam and switch means deenergizing the associated tool positioning motor after a predetermined travel of the associated second tool carrier and energizing the associated tool feed motor, and deenergizing the associated tool feed motor and reversely energizing the associated tool positioning motor responsive to a further predetermined movement of the associated second tool carrier.

5. A multi-spindle lathe according to claim 4, including a spindle indexing control cam affixed to said cam shaft, and follower drive means connecting said spindle indexing control cam and said spindle turret to index said spindle turret relative to said work stations upon rotation of said cam shaft.

6. A multi-spindle lathe according to claim 4, wherein said means connecting said cam shaft and said drive shaft include a magnetic clutch.

7. A multi-spindle lathe according to claim 6, including switch means adjacent at least two of said tool carriers to actuate said clutch when both carriers are in a starting position remote from their associated spindles.

References Cited by the Examiner
UNITED STATES PATENTS

| | | | |
|---|---|---|---|
| 2,029,094 | 1/36 | De Vlieg | 82—21 X |
| 2,118,024 | 5/38 | Potter et al. | 29—38 |
| 2,187,682 | 1/40 | Drissner | 82—25 X |
| 2,395,586 | 2/46 | Scott | 82—24 |
| 2,471,074 | 5/49 | Miller | 29—37 |
| 2,585,217 | 2/52 | Bickel et al. | 82—21 |
| 2,728,974 | 1/56 | Miller | 29—43 |

WILLIAM W. DYER, JR., *Primary Examiner.*

RICHARD H. EANES, JR., THOMAS E. BEALL,
*Examiners.*